Patented Mar. 31, 1925.

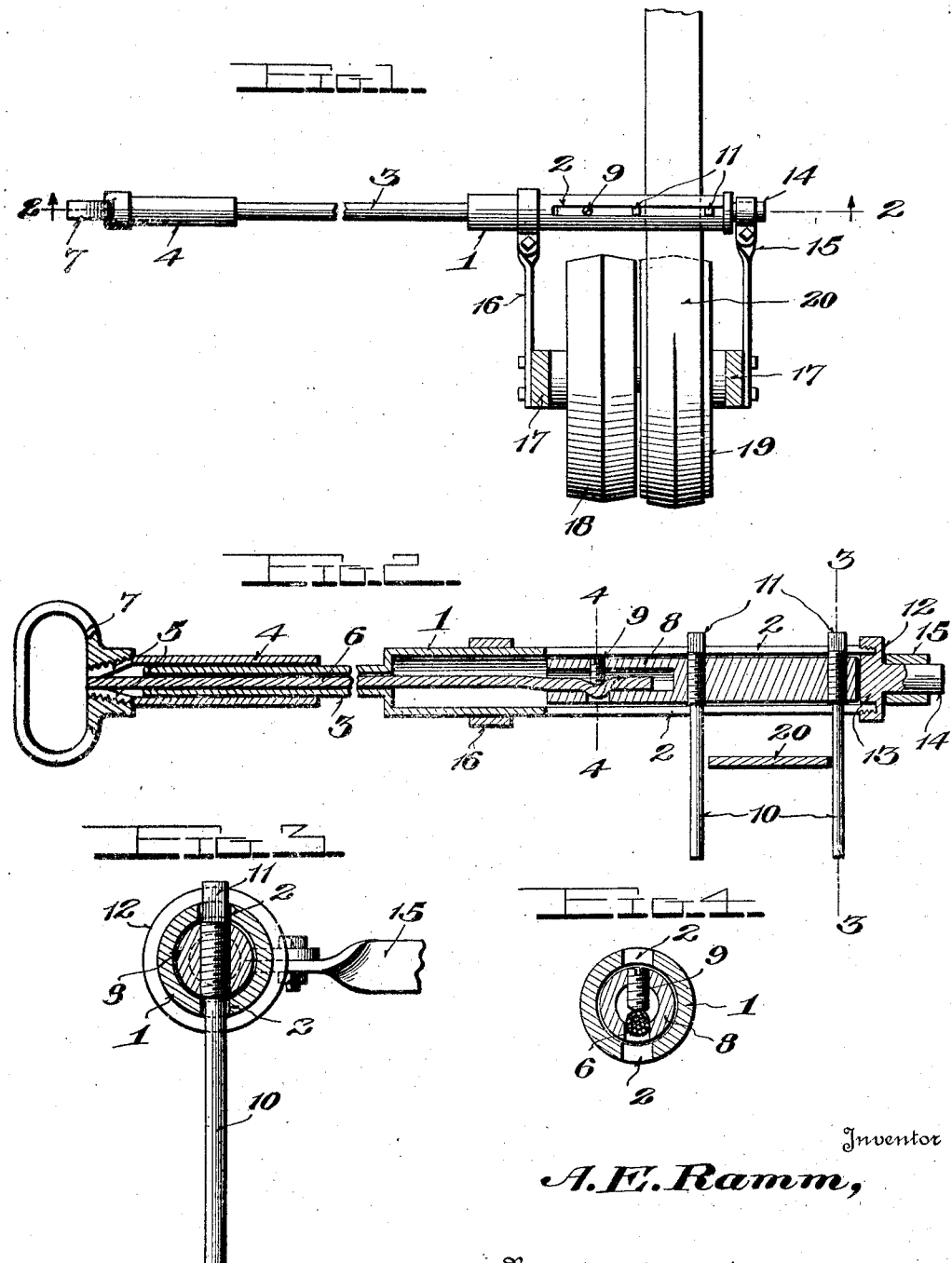

1,532,080

UNITED STATES PATENT OFFICE.

ALBERT E. RAMM, OF HERBERT, ILLINOIS.

BELT SHIFTER.

Application filed October 15, 1924. Serial No. 743,697.

*To all whom it may concern:*

Be it known that ALBERT E. RAMM, a citizen of the United States, residing at Herbert, in the county of Boone and State of Illinois, has invented certain new and useful Improvements in Belt Shifters, of which the following is a specification.

This invention relates to improvements in belt shifters, and more particularly to a belt shifter which will do away with the customary levers, links and pins, and will have as its main operative element, a single flexible cable for shifting the belt engaging rods or arms.

An object of the invention is to provide a highly efficient belt shifting mechanism which will be constructed from a minimum number of parts, and will be quite inexpensive to manufacture.

Other objects will appear as the description proceeds.

In the accompanying drawings which form a part of my application:

Figure 1 is a plan view of my improved belt shifter.

Fig. 2 is a sectional view taken on the line 2—2 of Fig. 1.

Fig. 3 is a sectional view taken on the line 3—3 of Fig. 2, and

Fig. 4 is a sectional view taken on the line 4—4 of Fig. 2.

Like characters of reference are used throughout the following specification and the accompanying drawings to designate like parts.

My approved belt shifter comprises a main body or housing 1, which is preferably cylindrical in cross section and is provided with oppositely disposed slots 2 in its upper and lower portions. The housing 1 is provided at one end with a reduced cable housing 3. A guide-tube 4 is adapted to fit snugly about the cable housing 3 and to be slidable thereon. The outer or free end of the said guide-tube 4 is provided with a plurality of tapered externally threaded fingers 5 which are adapted to engage and firmly hold the free end of the operating cable 6, when the handle portion 7 which is internally threaded is screwed into place over the said fingers.

An operating plunger 8 is formed so that it will readily slide within the main body or housing 1 and is recessed at its inner end and slotted so that the inner end of the operating cable may be received therein, and clamped in place by means of the set screw 9, as clearly illustrated in Fig. 2 of the drawings.

The opposite end of the plunger is provided with spaced, internally threaded openings through which the belt engaging or shifting arms are adapted to be received. The intermediate portions of the said arms 10 are externally threaded so that the same may be readily positioned within the plunger. The upper ends of the arms 10 are provided with squared heads 11, so that when the said arms are in position within the plunger, the same may be readily inserted in the main body of the housing 1 so that the squared portions 11 will engage the opposite surfaces of the upper slot 2, thereby preventing rotation of the belt engaging arms.

The inner end of the housing 1 is externally threaded and is adapted to receive the internally threaded cap member 12, which is provided with an extension portion 13 which will be positioned within the ends of the housing 1 to strengthen or reinforce the same. An extension 14 is formed on the opposite end of the member 12 and is provided for attaching a supporting clamp 15. A similar supporting clamp 16 may be positioned about the housing 1 and the opposite ends of the said clamps secured to the frame 17 which supports the pulleys 18 and 19. A belt 20 will be positioned about one of the pulleys so that when the engaging arms 10 are in position at either side thereof, the said belt may readily be shifted from one pulley to the other as desired, by simply pulling out or pushing in on the operating handle 7.

Many minor changes in detail of construction may be resorted to without departure from the spirit of the invention.

I claim:

1. A belt shifter comprising a housing, oppositely disposed slots formed therethrough, a recessed plunger slidable in said housing, removable belt engaging arms carried by said plunger, means at the upper ends of said arms for preventing rotation thereof, a cable housing formed integrally with said first mentioned housing, a cable therein being secured at its inner end in the recess in said plunger, a guide tube slidable on said cable housing, split fingers formed on the outer end of said guide tube and an operating handle adapted to thread onto said split fingers to clamp the free end of said operating cable.

2. The subject matter as set forth in claim 1 and means for supporting said belt shifter.

3. The subject matter as set forth in claim 1 and a removable threaded reinforcing member adapted to close the open end of said housing.

In testimony whereof I affix my signature.

ALBERT E. RAMM.